US011292137B2

(12) United States Patent
Igarashi et al.

(10) Patent No.: US 11,292,137 B2
(45) Date of Patent: Apr. 5, 2022

(54) END EFFECTOR AND MEMBER MOUNTING METHOD (71) Applicant: Shimizu Corporation, Tokyo (JP)

(72) Inventors: Syunsuke Igarashi, Tokyo (JP); Taku Tani, Tokyo (JP)

(73) Assignee: SHIMIZU CORPORATION, Tokyo (JP)

( * ) Notice: Subject to any disclaimer, the term of this patent is extended or adjusted under 35 U.S.C. 154(b) by 0 days.

(21) Appl. No.: 16/973,047

(22) PCT Filed: May 20, 2019

(86) PCT No.: PCT/JP2019/019980
§ 371 (c)(1),
(2) Date: Dec. 8, 2020

(87) PCT Pub. No.: WO2019/239811
PCT Pub. Date: Dec. 19, 2019

(65) Prior Publication Data
US 2021/0268666 A1 Sep. 2, 2021

(30) Foreign Application Priority Data
Jun. 12, 2018 (JP) .............................. JP2018-111539

(51) Int. Cl.
*B25J 15/00* (2006.01)
*E04F 21/18* (2006.01)
*B25J 15/06* (2006.01)

(52) U.S. Cl.
CPC ....... *B25J 15/0014* (2013.01); *B25J 15/0028* (2013.01); *B25J 15/0052* (2013.01); *B25J 15/0616* (2013.01); *E04F 21/1805* (2013.01)

(58) Field of Classification Search
CPC ................ B25J 15/0014; B25J 15/0028; B25J 17/0266; B25J 5/007; B25J 9/023;
(Continued)

(56) References Cited

U.S. PATENT DOCUMENTS

| 3,467,261 A | * | 9/1969 | Jewell | ................. E04F 21/1822 414/11 |
| 4,453,873 A | * | 6/1984 | Curti | ...................... B65G 59/02 221/220 |

(Continued)

FOREIGN PATENT DOCUMENTS

| JP | 5-25926 A | 2/1993 |
| JP | 9-29681 A | 2/1997 |

(Continued)

OTHER PUBLICATIONS

International Search Report and Written Opinion dated Jun. 25, 2019, received for PCT Application No. PCT/JP2019/019980, filed on May 20, 2019, 6 Pages including English Translation.
(Continued)

*Primary Examiner* — Gregory W Adams
(74) *Attorney, Agent, or Firm* — Xsensus LLP (57) ABSTRACT

An end effector including: a supporter configured to support a plate member; a support table provided at an end portion of the supporter via an universal joint and configured to support the plate member by making surface contact with the plate member; holding unit including a pair of holders configured to move linearly in a planar direction while the support table is interposed between the pair of holders in the planar direction, the holding unit being fixed to a base portion of the support table; and electric cylinders configured to change an inclination angle of the support table with respect to the supporter.

4 Claims, 4 Drawing Sheets

(58) Field of Classification Search
CPC ... B25J 5/00; E04F 21/1805; Y10T 74/20335; Y10T 74/20305; B65G 47/90; B65B 35/16
USPC .............................. 901/28, 29; 414/10, 11, 12
See application file for complete search history.

(56) References Cited

U.S. PATENT DOCUMENTS

| | | | | |
|---|---|---|---|---|
| 4,561,176 | A * | 12/1985 | Leddet | B23P 19/10 29/709 |
| 4,676,713 | A * | 6/1987 | Voelpel | B65G 49/061 414/590 |
| 4,852,237 | A * | 8/1989 | Tradt | B62D 65/06 29/407.05 |
| 5,053,687 | A * | 10/1991 | Merlet | F16H 21/46 318/568.2 |
| 5,740,699 | A * | 4/1998 | Ballantyne | B25J 17/0266 403/120 |
| 5,987,726 | A * | 11/1999 | Akeel | B23P 19/105 29/407.08 |
| 6,330,837 | B1 * | 12/2001 | Charles | B25J 11/00 74/490.06 |
| 7,555,969 | B2 * | 7/2009 | Okazaki | B25J 9/1075 74/490.05 |
| 7,592,768 | B2 * | 9/2009 | Shirai | B25J 15/0009 318/568.11 |
| 7,766,596 | B2 * | 8/2010 | Smith | E04G 21/168 414/11 |
| 8,185,243 | B2 * | 5/2012 | Okazaki | B25J 15/0095 700/260 |
| 2008/0127768 | A1 | 6/2008 | Shirai et al. | |

FOREIGN PATENT DOCUMENTS

| | | |
|---|---|---|
| JP | 2002-295002 A | 10/2002 |
| JP | 3172281 U | 11/2011 |
| JP | 2017-110466 A | 6/2017 |
| JP | 2018-53536 A | 4/2018 |
| WO | 2006/054443 A1 | 5/2008 |

OTHER PUBLICATIONS

Japanese Notice of Reasons for Refusal dated Jan. 12, 2022 in Japanese Application No. 2018-111539.

* cited by examiner

END EFFECTOR AND MEMBER MOUNTING METHOD

CROSS-REFERENCE TO RELATED APPLICATIONS

The present application is based on PCT filing PCT/JP2019/019980, filed May 20, 2019, which claims priority to JP 2018-111539, filed Jun. 12, 2018, the entire contents of each are incorporated herein by reference.

FIELD

The present invention relates to an end effector and a member mounting method that are suitable for holding a ceiling panel to be mounted on a ceiling, for example, in a ceiling construction.

BACKGROUND

In conventional ceiling construction of a building, execution of mounting ceiling suspending bolts and ceiling panels is performed. Normally, workers manually perform such execution work by using a vehicle for work at height, scaffolds, or the like while looking upward. In general, when the ceiling panel is mounted, the worker needs to perform the mounting work by holding the ceiling panel lifted to the ceiling by one hand and using a tool and so on by the other hand.

In order to reduce the above-mentioned burdens on the workers, the applicant of the present invention has already proposed a construction work robot disclosed in Patent Literature 1. The construction work robot mounts a member such as the ceiling panel on a substrate material (base material) by sucking and holding the member to an end effector and lifting it to an execution position by a manipulator.

CITATION LIST

Patent Literature

Patent Literature 1: Japanese Patent Application Laid-open No. 2017-110466

When the ceiling panel is applied to the substrate material by the construction work robot described in Patent Literature 1, reduction in time taken for adjusting the orientation and inclination of the ceiling panel is preferable in order to improve efficiency of the work. A technology enabling the reduction in time taken for adjusting the orientation and inclination of the ceiling panel has therefore been needed.

SUMMARY

Technical Problem

The present invention has been made in view of the above-mentioned circumstances and an object thereof is to provide an end effector and a member mounting method for efficiently adjusting the orientation and inclination of a plate-like member.

Solution to Problem

To solve the problem and achieve the object, an end effector according to the present invention that is used for holding a plate-like member and mounting the member at a predetermined position, includes: a supporting means for supporting the member; a support table provided at an end portion of the supporting means via an universal joint, the support table being configured to support the member by making surface contact with the member; holding means fixed to a base portion of the support table, the holding means being configured to move linearly in a planar direction while the support table is interposed between the holding means in the planar direction; and an angle changing means configured to change an inclination angle of the support table with respect to the supporting means.

Moreover, in the end effector according to the present invention, the angle changing means is provided between the supporting means and a base portion of the support table, and the angle changing means includes: a first support member configured to rotate the base portion of the support table about a first axis by contracting and extending in a direction substantially perpendicular to the support table; and a second support member configured to rotate the base portion of the support table about a second axis orthogonal to the first axis.

Moreover, in the end effector according to the present invention, the member has a rectangular plate shape, and the holding means includes: engagement portions provided at the sides of opposing sides of the member, the engagement portions being configured to engage with the opposing sides of the member; moving means configured to move the engagement portions in directions of making the engagement portions close to and away from each other; and storage means configured to store therein the engagement portions.

Moreover, a construction work robot according to the present invention includes the end effector according to the present invention.

Moreover, a method of mounting a member according to the present invention by holding a member having a rectangular plate shape and mounting the held member on a lattice-form support material above the held member using the end effector according to the present invention, includes: a step of holding the member by operating the holding means after abutting the support table of the end effector against a surface of the member; a step of moving the end effector holding the member to a vicinity of the support material; a step of changing an orientation of the end effector such that the member held by the end effector is able to pass through a lattice-form opening surround by the support material from a lower side to an upper side; a step of moving the member held by the end effector to pass through the lattice-form opening surrounded by the support material from the lower side to the upper side; a step of adapting an orientation of the member held by the end effector to the lattice-form opening, by changing the orientation of the end effector, after moving the member held by the end effector to pass through the lattice-form opening; a step of applying one end of the member to one end of the support material by changing a height of the end effector and an inclination angle of the support table, after adapting the orientation of the member held by the end effector to the lattice-form opening, and then, operating the holding means to release holding of the member by the end effector and store the holding means; and a step of lowering the support table by lowering the end effector such that the other end of the member is automatically applied to the other end of the support material.

Advantageous Effects of Invention

The end effector according to the present invention is used for holding the plate-like member and mounting the member at the predetermined position and includes: the supporting means for supporting the member; the support table provided at the end portion of the supporting means via the universal joint and making surface contact with the member to support the member; the holding means fixed to the base portion of the support table so as to be linearly movable in the planar direction on both sides with the support table interposed in the planar direction; and the angle changing means for changing the inclination angle of the support table with respect to the supporting means. The end effector can therefore adjust the inclination of the member on the support table by changing the inclination angle of the support table by the angle changing means. Furthermore, the orientation of the member on the support table with respect to an external substrate material or the like can be adjusted by rotationally moving the end effector itself or the supporting means about its axis. The end effector thereby provides effects that time taken for adjusting the orientation and inclination of the held member can be reduced and mounting work of the member on the substrate material or the like can be efficiently performed.

With the end effector according to another aspect of the invention, the angle changing means is configured by the first support member that is provided between the supporting means and the base portion of the support table and contracts and extends in the direction substantially perpendicular to the support table to rotationally move the base portion of the support table about the first axis and the second support member that is rotationally movable about the second axis orthogonal to the first axis. The end effector thereby provides an effect that the angle changing means can be configured with a simple structure.

With the end effector according to still another aspect of the invention, the member has the rectangular plate shape, and the holding means include the engagement portions provided on the sides of the opposing sides of the member for engagement with the opposing sides of the member, the moving means configured to move the engagement portions in directions of making the engagement portions close to and away from each other, and the storage means configured to store therein the engagement portions. The end effector thereby provides an effect of facilitating work of arranging the member on the support table in an abutment manner by storing the engagement portions when the member is held from a housing portion.

The construction work robot according to the present invention includes the above-mentioned end effector, thereby providing an effect that efficiency of mounting work of the member by the construction work robot can be improved.

The member mounting method according to the present invention is the method in which the member having the rectangular plate shape is held using the above-mentioned end effector and the held member is mounted on the lattice-form support material above the member, and includes: the step of operating the holding means to hold the member after the support table of the end effector is made to abut against a surface of the member; the step of moving the end effector holding the member to the vicinity of the support material; the step of changing the orientation of the end effector such that the member held by the end effector is able to pass through the lattice-form opening surround by the support material to the upper side from the lower side; the step of moving the member held by the end effector to the upper side from the lower side to pass through the lattice-form opening surrounded by the support material; the step of adapting, to the lattice-form opening, the orientation of the member held by the end effector by changing the orientation of the end effector after moving the member to pass through the lattice-form opening; the step of applying one end of the member to one end of the support material by changing the height of the end effector and the inclination angle of the support table after adapting, to the lattice-form opening, the orientation of the member, and then, operating the holding means to release holding of the member by the end effector and storing the holding means; and the step of lowering the support table by lowering the end effector to automatically apply the other end of the member to the other end of the support material. The member mounting method thereby provides an effect that mounting work of the member on the substrate material or the like of the ceiling can be efficiently performed.

DESCRIPTION OF EMBODIMENTS

Hereinafter, embodiments of an end effector and a member mounting method according to the present invention will be described in detail with reference to the drawings. The embodiments do not limit the invention.

Figure 1:
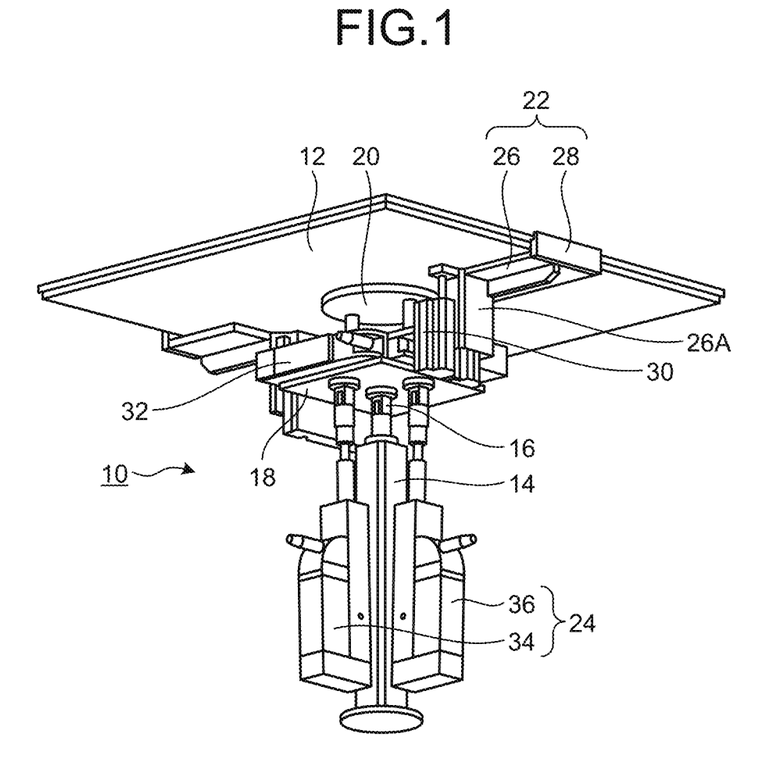
FIG. 1 is a schematic perspective view illustrating an embodiment of an end effector according to the present invention.

As illustrated in FIG. 1, an end effector 10 according to the embodiment is used for holding a ceiling panel 12 (member) having a rectangular plate shape and mounting the member on a substrate material (at a predetermined position). The end effector 10 is mounted on the front end of a manipulator (robot arm) of the above-mentioned construction work robot in a detachable manner.

The end effector 10 includes a square bar-shaped supporting means 14 for supporting the ceiling panel 12. A base plate 18 (base portion) is mounted on an upper end portion of the supporting means 14 via an universal joint 16. A support table 20 is fixed in a plane parallel manner above the base plate 18 through a pillar. The support table 20 is a disc-shaped table on which the ceiling panel 12 is arranged on the upper surface, and the center of a circle thereof is positioned on an extended line of an axial line of the supporting means 14.

The end effector 10 further includes holding means 22, an angle changing means 24, and a controlling means (not illustrated) controlling them.

Figure 2:
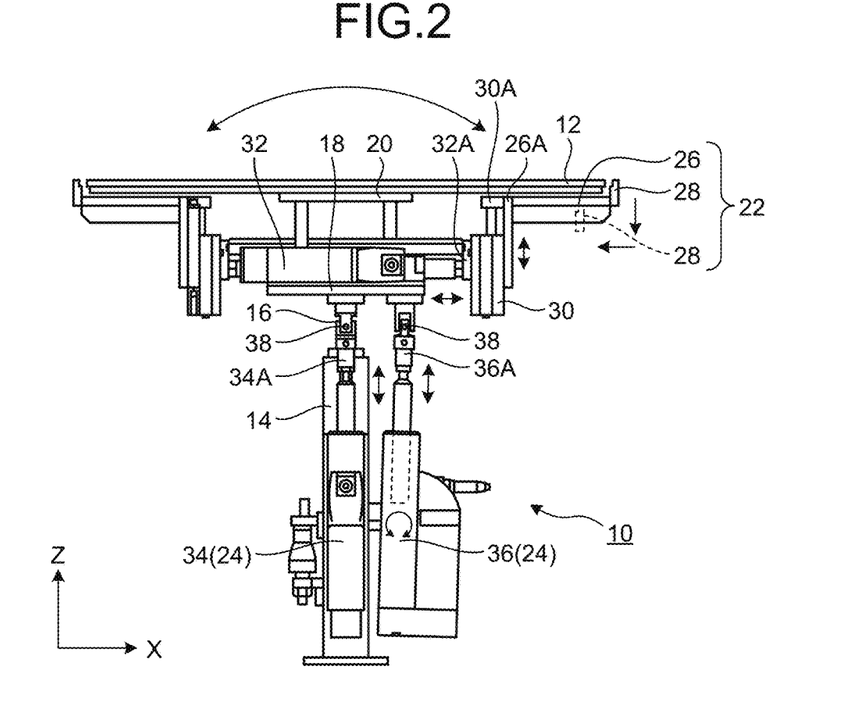
FIG. 2 is a side view illustrating the embodiment of the end effector according to the invention.
Figure 3:
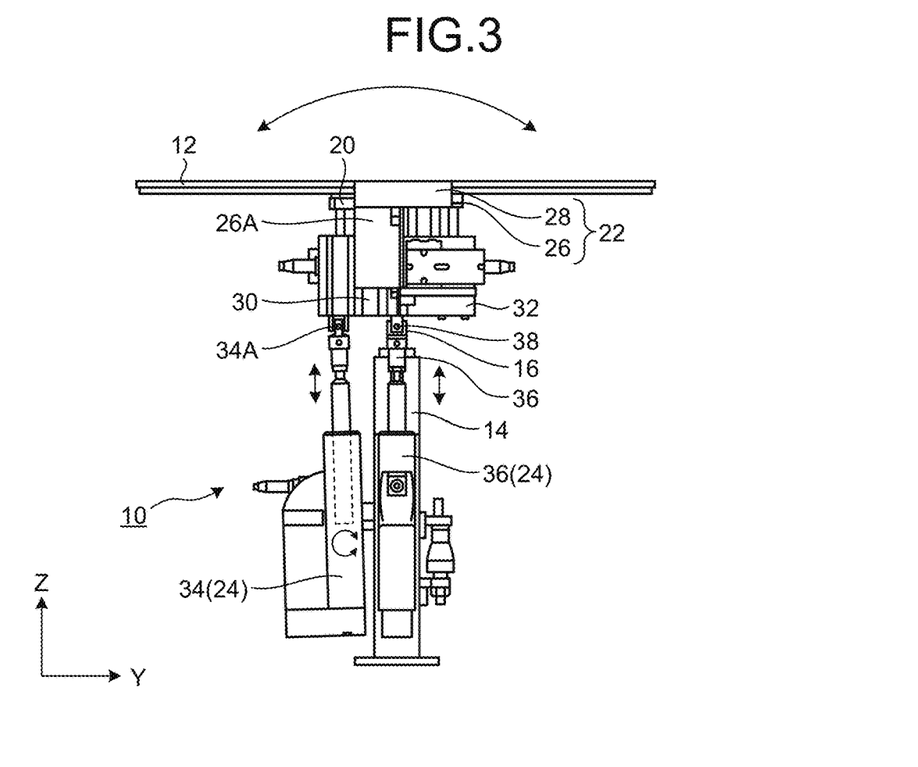
FIG. 3 is a side view illustrating the embodiment of the end effector according to the invention.
Figure 4:
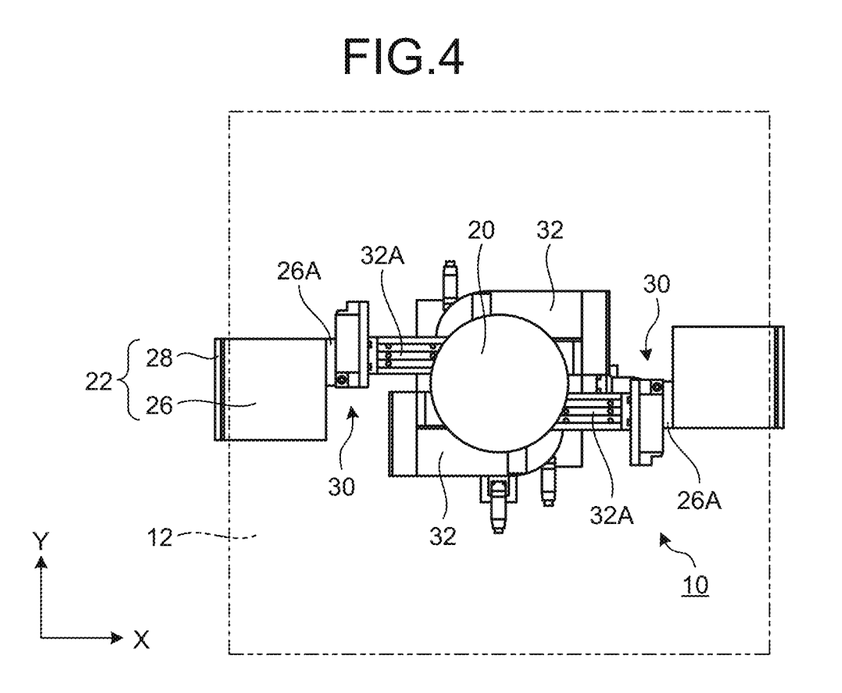
FIG. 4 is a top view illustrating the embodiment of the end effector according to the invention.

As illustrated in FIG. 2 to FIG. 4, the holding means 22 are provided on both sides with the support table 20 interposed therebetween in an X-axis direction (planar direction) and are fixed to the base plate 18 so as to be linearly movable in the X-axis direction. The holding means 22 include a pair of holders 26 for supporting sides of both opposing sides of the ceiling panel 12, hooks 28 (engagement portions), air cylinders 30 (storage means), and electric cylinders 32

(moving means). The holders 26 and the hooks 28 are provided at symmetric positions on both sides of the circle of the support table 20.

The upper surfaces of the holders 26 are made flush with the upper surface of the support table 20 or are slightly lower than it. The hooks 28 are used for engagement with the opposing sides of the ceiling panel 12 and are provided on the outer ends of the holders 26.

The air cylinders 30 are used for storing the holders 26 and the hooks 28 and are provided so as to correspond to the respective holders 26. Rods 30A of the air cylinders 30 are coupled to base portions 26A at the inner ends of the holders 26. When the rods 30A of the air cylinders 30 contract or extend in a Z-axis direction, the holders 26 move in the Z-axis direction. For example, when the rods 30A of the air cylinders 30 contract, as illustrated in FIG. 2, the holders 26 and the hooks 28 move downward in the Z-axis direction. When the ceiling panel 12 is not held, the holders 26 and the hooks 28 can therefore be stored below the support table 20. Interference of the hooks 28 can be prevented by storing the hooks 28 when the ceiling panel 12 is arranged on the support table 20 in an abutment manner, thereby arranging the ceiling panel 12 on the upper surface of the support table 20 easily.

The electric cylinders 32 move the holders 26 in the directions of making the hooks 28 close to or away from each other for a holding operation and a releasing operation of the ceiling panel 12 and are provided so as to correspond to the respective holders 26. Rods 32A of the electric cylinders 32 are coupled to main bodies of the air cylinders 30. Main bodies of the electric cylinders 32 are fixed to the base plate 18. When the rods 32A of the electric cylinders 32 contract or extend in the X-axis direction, the holders 26 and the hooks 28 move in the X-axis direction through the air cylinders 30. For example, when the rods 32A of the electric cylinders 32 contract, the holders 26 and the hooks 28 move so as to make close to each other in the X-axis direction, and both hooks 28 abut against and are engaged with both opposing sides of the ceiling panel 12 to hold the ceiling panel 12. Holding force can be appropriately adjusted by, for example, previously setting the extension length of the rods 32A in accordance with the dimension of the ceiling panel 12. On the other hand, when the rods 32A of the electric cylinders 32 extend, the holders 26 and the hooks 28 move so as to be separated from each other in the X-axis direction, and both hooks 28 are away from both opposing sides of the ceiling panel 12. Holding of the ceiling panel 12 is thereby released. Thereafter, the holders 26 and the hooks 28 are moved downward by contracting the rods 30A of the air cylinders 30, and then, the holding means 22 are stored below the support table 20 by contracting the rods 32A of the electric cylinders 32. That is to say, the electric cylinders 32 have a function of storing the holding means 22 after installation of the ceiling panel 12 in addition to the function of holding the ceiling panel 12. The holding means 22 can be prevented from making contact with a ceiling substrate material P assembled in a lattice form beforehand by storing the holding means 22.

The angle changing means 24 is used for changing the inclination angle of the support table 20 with respect to the axial line of the supporting means 14 and is configured by an electric cylinder 34 (first support member) and an electric cylinder 36 (second support member). As illustrated in FIG. 1 to FIG. 3, the electric cylinders 34 and 36 are provided between the supporting means 14 and the base plate 18. As illustrated in FIG. 2 and FIG. 3, a main body of the electric cylinder 34 is fixed to the side surface of the supporting means 14 in a Y-axis direction so as to be rotationally movable about the X axis. A main body of the electric cylinder 36 is fixed to the side surface of the supporting means 14 in the X-axis direction so as to be rotationally movable about the Y axis. Rods 34A and 36A are fixed to the base plate 18 with universal joints 38.

As illustrated in FIG. 3, when the rod 34A contracts and extends in the substantially Z-axis direction (substantially up-down direction), the support table 20 is rotationally movable about the X axis (first axis). As illustrated in FIG. 2, when the rod 36A contracts and extends in the substantially Z-axis direction (substantially up-down orientation), the support table 20 is rotationally movable about the Y axis (second axis).

The inclination of the ceiling panel 12 on the support table 20 can be adjusted by changing the inclination angle of the support table 20 by the angle changing means 24. Furthermore, the orientation of the ceiling panel 12 on the support table 20 with respect to the external substrate material or the like can be adjusted by rotationally moving the end effector 10 itself or the supporting means 14 about its axis. The embodiment therefore enables time taken for adjusting the orientation and inclination of the held member to be reduced and enables the mounting work of the ceiling panel 12 on the substrate material or the like to be efficiently performed.

Figure 5:
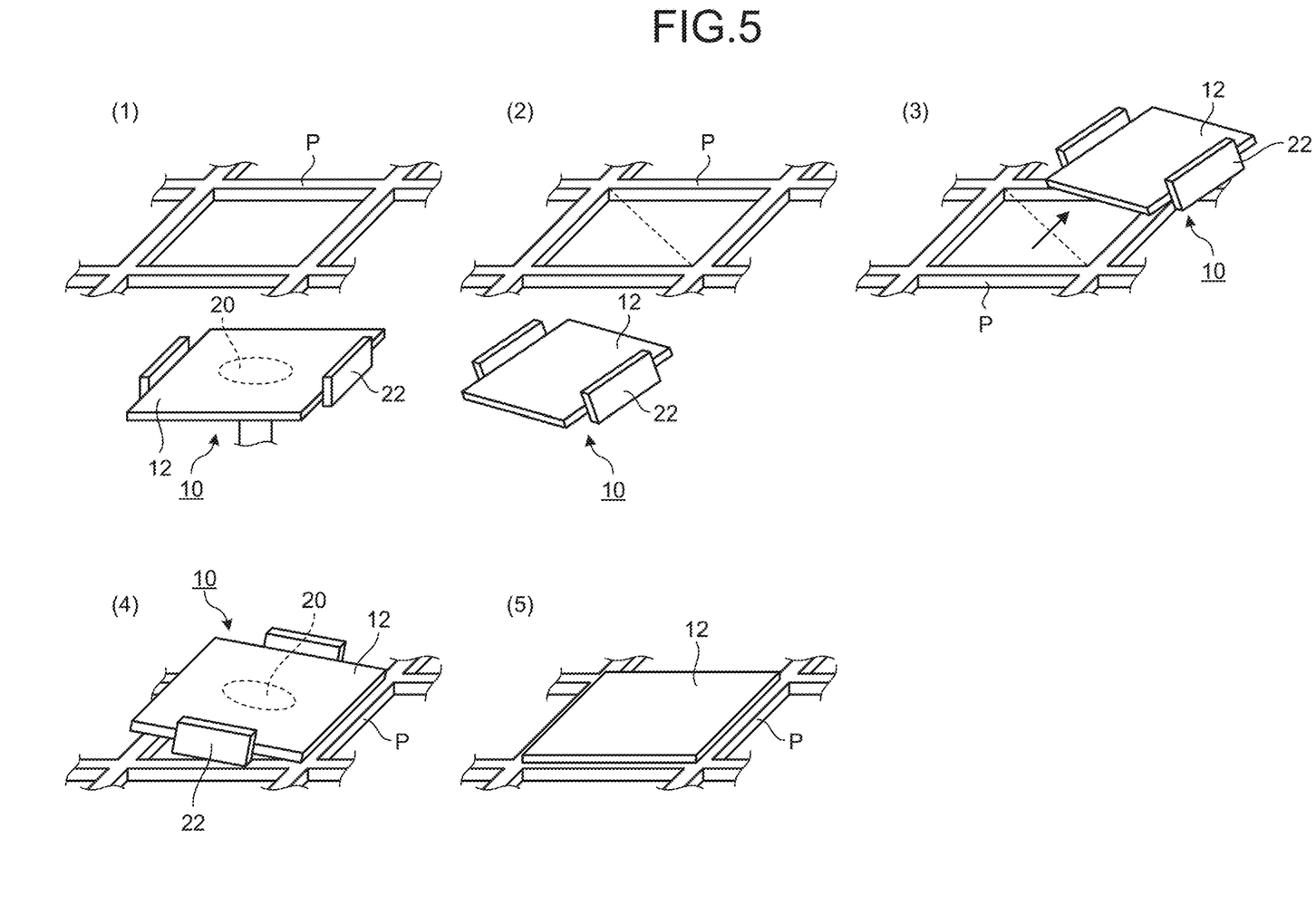
FIG. 5 is a schematic procedure view illustrating an embodiment of a member mounting method according to the invention.

Next, a method of mounting the ceiling panel 12 using the above-mentioned end effector 10 will be described with reference to FIG. 5 and FIG. 1. In FIG. 5(2) to FIG. 5(5), illustration of the end effector 10 is omitted for the convenience. It should be noted that the manipulator (not illustrated) performs a movement operation of the end effector 10.

First, as illustrated in FIG. 1, the support table 20 of the end effector 10 is made to abut against the surface of the ceiling panel 12, and then, the holding means 22 are operated to hold the ceiling panel 12.

Then, as illustrated in FIG. 5(1), the orientation of the end effector 10 is changed by operating the manipulator to make the surface of the held ceiling panel 12 face upward. The end effector 10 is further moved to the vicinity of the substrate material P (support material) installed in a square lattice form under a ceiling surface. Subsequently, as illustrated in FIG. 5(2), the orientation of the end effector 10 is changed by operating the manipulator such that one side of the ceiling panel 12 is parallel with and directly faces a diagonal line of a square opening surrounded by the substrate material P. Then, the ceiling panel 12 is inclined obliquely with respect to the horizon by operating the manipulator and the angle changing means 24 such that one side of the ceiling panel 12 is on an obliquely upper side and an opposing side thereof is on an obliquely lower side. The ceiling panel 12 can thereby pass through the position of the diagonal line of the square opening toward the obliquely upper side from the obliquely lower side.

After that, as illustrated in FIG. 5(3), the end effector 10 is lifted obliquely upward by operating the manipulator to thereby insert one side of the ceiling panel 12 from the position of the diagonal line of the square opening and lift the entire ceiling panel 12 to the upper side of the substrate material P. Subsequently, as illustrated in FIG. 5(4), the orientation of the ceiling panel 12 is adapted to the square opening by operating the manipulator and the angle changing means 24, and then, one side of the ceiling panel 12 is applied to one side of the substrate material P by changing the height of the end effector 10 and the inclination angle of the support table 20. Thereafter, as illustrated in FIG. 5(5), the holding means 22 are operated to release holding of the ceiling panel 12, and then, the holding means 22 are stored under the support table 20. The holding means 22 can be prevented from making contact with the substrate material P beforehand by storing the holding means 22. Thereafter, the support table 20 is lowered by lowering the end effector 10. The opposing side of the ceiling panel 12 is thereby automatically applied to the substrate material P. The embodiment therefore enables time taken for adjusting the orientation and inclination of the ceiling panel 12 to be reduced and enables the mounting work of the ceiling panel 12 on the substrate material P to be efficiently performed.

As described above, the end effector according to the invention is used for holding the plate-like member and mounting the member at a predetermined position. The end effector includes: the supporting means for supporting the member; the support table provided at the end portion of the supporting means through the universal joint and making surface contact with the member to support the member; the holding means fixed to the base portion of the support table so as to be linearly movable in the planar direction on both sides with the support table interposed therebetween in the planar direction; and the angle changing means for changing the inclination angle of the support table with respect to the supporting means. The end effector can therefore adjust the inclination of the member on the support table by changing the inclination angle of the support table by the angle changing means. Furthermore, the orientation of the member on the support table with respect to the external substrate material or the like can be adjusted by rotationally moving the end effector itself or the supporting means about its axis. With this configuration, time taken for adjusting the orientation and inclination of the held member can be reduced, and the mounting work of the member on the substrate material or the like can be efficiently performed.

With the end effector according to another aspect of the invention, the angle changing means is configured by the first support member that is provided between the supporting means and the base portion of the support table and contracts and extends in the direction substantially perpendicular to the support table to rotationally move the base portion of the support table about the first axis and the second support member that is rotationally movable about the second axis orthogonal to the first axis. The angle changing means can therefore be configured with a simple structure.

With the end effector according to still another aspect of the invention, the member has the rectangular plate shape, and the holding means include the engagement portions provided on the sides of the opposing sides of the member for engagement with the opposing sides of the member, the moving means configured to move the engagement portions in the directions of making them close to and away from each other, and the storage means configured to store therein the engagement portions. The work of arranging the member on the support table in the abutment manner can therefore be facilitated by storing the engagement portions when the member is held from the housing portion.

The construction work robot according to the invention includes the above-mentioned end effector, thereby improving the efficiency of the mounting work of the member by the construction work robot.

The member mounting method according to the invention is the method in which the member having the rectangular plate shape is held using the above-mentioned end effector and the held member is mounted on the lattice-form support material above the member, and includes: the step of operating the holding means to hold the member after the support table of the end effector is made to abut against the surface of the member; the step of moving the end effector holding the member to the vicinity of the support material, the step of changing the orientation of the end effector such that the member held by the end effector is able to pass through the lattice-form opening surround by the support material to the upper side from the lower side; the step of moving the member held by the end effector to the upper side from the lower side to pass through the lattice-form opening surrounded by the support material; the step of adapting, to the lattice-form opening, the orientation of the member held by the end effector by changing the orientation of the end effector after moving the member to pass through the lattice-form opening; the step of applying one end of the member to one end of the support material by changing the height of the end effector and the inclination angle of the support table after adapting, to the lattice-form opening, the orientation of the member, and then, operating the holding means to release holding of the member by the end effector and storing the holding means; and the step of lowering the support table by lowering the end effector to automatically apply the other end of the member to the other end of the support material. The member mounting method therefore enables the mounting work of the member on the substrate material or the like of the ceiling to be efficiently performed.

INDUSTRIAL APPLICABILITY

As described above, the end effector and the member mounting method according to the invention are useful for the mounting work of the ceiling panel on the substrate material in the ceiling construction of the building and are suitable for reduction in time taken for the mounting work.

REFERENCE SIGNS LIST

10 END EFFECTOR
12 CEILING PANEL (MEMBER)
14 SUPPORTING MEANS
16 UNIVERSAL JOINT
18 BASE PLATE (BASE PORTION)
20 SUPPORT TABLE
22 HOLDING MEANS
24 ANGLE CHANGING MEANS
26 HOLDER
26A BASE PORTION
28 HOOK (ENGAGEMENT PORTION)
30 AIR CYLINDER (STORAGE MEANS)
30A, 32A ROD
32 ELECTRIC CYLINDER (MOVING MEANS)
34 ELECTRIC CYLINDER (FIRST SUPPORT MEMBER)
36 ELECTRIC CYLINDER (SECOND SUPPORT MEMBER)
34A, 36A ROD
P SUBSTRATE MATERIAL (SUPPORT MATERIAL)

The invention claimed is:

1. An end effector comprising:
a supporter configured to support a plate member;
a support table provided at an end portion of the supporter via an universal joint and configured to support the plate member by making surface contact with the plate member;
holding unit including a pair of holders configured to move linearly in a planar direction while the support table is interposed between the pair of holders in the planar direction, the holding unit being fixed to a base portion of the support table; and electric cylinders configured to change an inclination angle of the support table with respect to the supporter, wherein the plate member has a rectangular plate shape, and the holding unit further includes:
- engagement portions provided at the sides of opposing sides of the plate member, the engagement portions being configured to engage with the opposing sides of the plate member;
- first cylinders, each of the first cylinders being configured to move each of the engagement portions in directions of making the engagement portions close to and away from each other; and
- second cylinders, each of the second cylinders being configured to move each of the engagement portions in a direction perpendicular to the planar direction so as to store the engagement portions under the support table.

2. The end effector according to claim 1, wherein the electric cylinders are provided between the supporter and the base portion of the support table, and includes:
- a first electric cylinder configured to rotate the base portion of the support table about a first axis by contracting and extending in a direction substantially perpendicular to the support table; and
- a second electric cylinder configured to rotate the base portion of the support table about a second axis orthogonal to the first axis.

3. A construction work robot comprising an end effector including:
- a supporter configured to support a plate member;
- a support table provided at an end portion of the supporter via an universal joint and configured to support the plate member by making surface contact with the plate member;
- holding unit including a pair of holders configured to move linearly in a planar direction while the support table is interposed between the pair of holders in the planar direction, the holding unit being fixed to a base portion of the support table; and
- electric cylinders configured to change an inclination angle of the support table with respect to the supporter, wherein the plate member has a rectangular plate shape, and the holding unit further includes:
- engagement portions provided at the sides of opposing sides of the plate member, the engagement portions being configured to engage with the opposing sides of the plate member;
- first cylinders, each of the first cylinders being configured to move each of the engagement portions in directions of making the engagement portions close to and away from each other; and
- second cylinders, each of the second cylinders being configured to move each of the engagement portions in a direction perpendicular to the planar direction so as to store the engagement portions under the support table.

4. A method of mounting a plate member by holding the plate member having a rectangular plate shape and mounting the held plate member on a lattice-form support material above the held plate member using an end effector including:
- a supporter configured to support the plate member;
- a support table provided at an end portion of the supporter via an universal joint and configured to support the plate member by making surface contact with the plate member;
- holding unit including a pair of holders configured to move linearly in a planar direction while the support table is interposed between the pair of holders in the planar direction, the holding unit being fixed to a base portion of the support table; and
- electric cylinders configured to change an inclination angle of the support table with respect to the supporter, the method comprising:
- holding the plate member by operating the holding unit after abutting the support table of the end effector against a surface of the plate member;
- moving the end effector holding the plate member to a vicinity of the support material;
- changing an orientation of the end effector such that the plate member held by the end effector is able to pass through a lattice-form opening surround by the support material from a lower side to an upper side;
- moving the plate member held by the end effector to pass through the lattice-form opening surrounded by the support material from the lower side to the upper side;
- adapting an orientation of the plate member held by the end effector to the lattice-form opening by changing the orientation of the end effector;
- applying one end of the plate member to one end of the support material by changing a height of the end effector and an inclination angle of the support table;
- operating the holding unit to release holding of the plate member by the end effector and store the engagement portions; and
- lowering the support table by lowering the end effector such that the other end of the plate member is automatically applied to the other end of the support material, wherein the plate member has a rectangular plate shape, and the holding unit further includes:
- engagement portions provided at the sides of opposing sides of the plate member, the engagement portions being configured to engage with the opposing sides of the plate member;
- first cylinders, each of the first cylinders being configured to move each of the engagement portions in directions of making the engagement portions close to and away from each other; and
- second cylinders, each of the second cylinders being configured to move each of the engagement portions in a direction perpendicular to the planar direction so as to store the engagement portions under the support table.

* * * * *